United States Patent [19]
DiStefano et al.

[11] Patent Number: 5,470,002
[45] Date of Patent: Nov. 28, 1995

[54] FOOD CONTAINER SELF-LEVELING DEVICE

[76] Inventors: Richard DiStefano, 1798 Norm Pl., Seaford, N.Y. 11783; Alfred DiStefano, 8010 NW. 101st Ave., Tamarac, Fla. 33321

[21] Appl. No.: 304,251

[22] Filed: Sep. 12, 1994

Related U.S. Application Data

[63] Continuation-in-part of Ser. No. 992,792, Dec. 18, 1992, abandoned.

[51] Int. Cl.[6] ........................................... B60R 7/00
[52] U.S. Cl. ........................... 224/275; 224/282; 206/522
[58] Field of Search ............................... 224/275, 273, 224/282, 42.36, 42.34, 42.32; 220/484; 229/104, 109; 383/110, 3; 206/522; 248/454, 106

[56] References Cited

U.S. PATENT DOCUMENTS

| | | | |
|---|---|---|---|
| 3,338,629 | 8/1967 | Drees | 224/275 |
| 3,499,595 | 3/1970 | Brooks | 229/104 |
| 4,384,602 | 5/1983 | Ores | 383/3 |
| 4,967,992 | 11/1990 | Menaged | 248/454 |
| 5,102,080 | 4/1992 | Atieri, Jr. | 224/275 |

FOREIGN PATENT DOCUMENTS 2230509  10/1990  United Kingdom ................ 206/522

*Primary Examiner*—Linda J. Sholl
*Attorney, Agent, or Firm*—Michael I. Kroll

[57]  ABSTRACT

A self-leveling food container device is provided which consists of a food carrying case sized to accommodate food therein. An integral mechanism is provided with the carrying case for automatic leveling when placed on a motor vehicle seat, so as to prevent the food within the carrying case from sliding and spilling while being transported. Insulated walls are provided to maintain food temperatures. Heating coils within the insulated walls allow warming of food during transport. An inflatable air bladder provides both the leveling mechanism and a vibration isolation function.

17 Claims, 2 Drawing Sheets

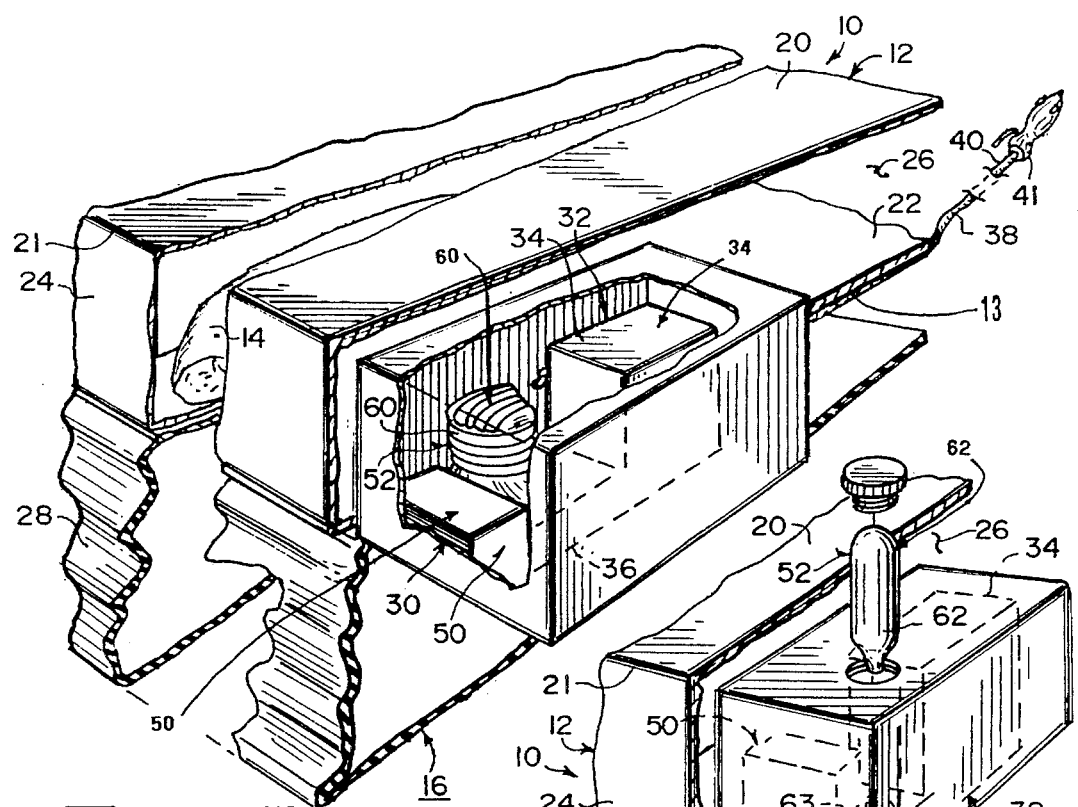
_Fig.3_
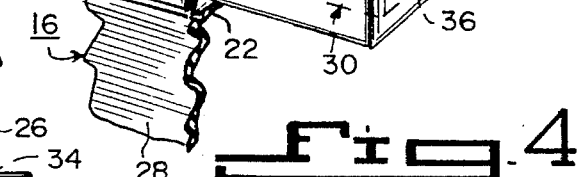
_Fig.4_
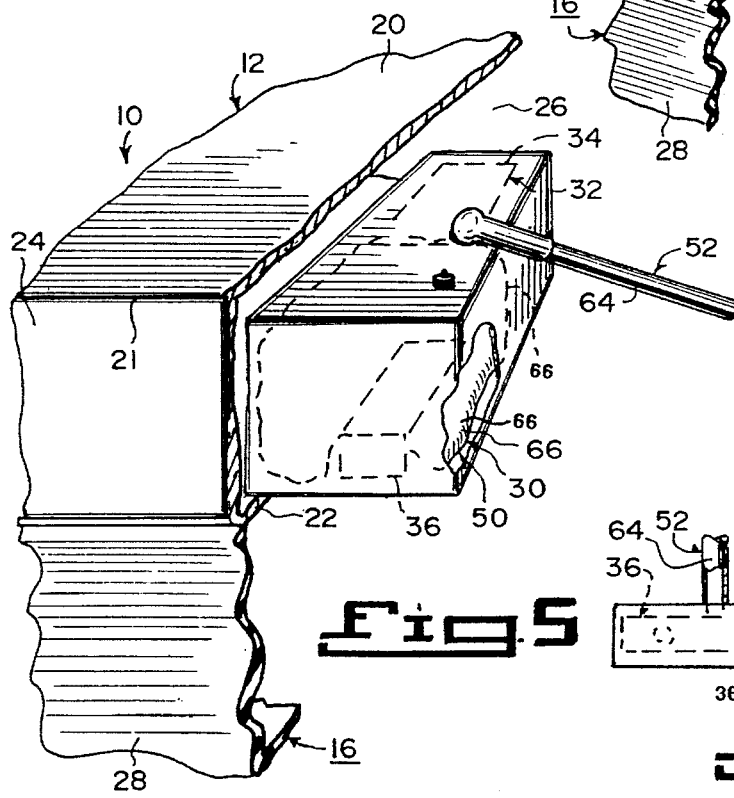
_Fig.5_
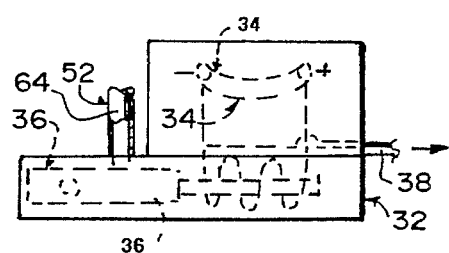
_Fig.6_

FOOD CONTAINER SELF-LEVELING DEVICE

CROSS REFERENCE TO RELATED APPLICATION

This application is a continuation-in-part of application Ser. No. 07/992,792, filed Dec. 18, 1992, now abandoned.

BACKGROUND OF THE INVENTION

1. Field of the Invention

The instant invention relates generally to food product carriers and more specifically it relates to a food container self-leveling device. Even more specifically, it relates to an insulated, heated, self-leveling, automotive seat belt restrained, pizza food delivery device.

Food delivery via motor vehicle is becoming a very large industry in this country. The homeowner is becoming more and more inclined to order food by telephone for delivery to the home. One reason for this is the ability of restaurants to deliver freshly prepared foods rapidly while still hot and palatable. Various food warmers, such as steam tables, candle warmers, etc., have been known for years in the cafeteria segment of the restaurant industry. However, a truly portable means of delivering hot food without spillage in a vehicle has not been devised. Liquid and amorphous prepared food products must be kept warm and level during delivery to assure an appetizing taste and a pleasing appearance. Prior delivery devices have simply failed in one or both of these bottom line requirements. It is known, for example that pizza is often delivered in insulated carrying containers to preserve the warmth. However, the best known insulated containers do not preserve the warmth of food for extended periods. In addition, less viscous foods, such as soup, are not amenable to delivery in such containers because they have no means of maintaining a level position or absorbing shocks in the dynamic bouncing environment of a moving vehicle.

The restaurant field is seen as the most obvious benefactor from the unique apparatus of the present invention. However, is envisioned that the field of medicine could also be enhanced. For example the rapid delivery of donor organs from accident sites to hospitals must be made with a minimum vibration or temperature shock to the organ. The natural vibration isolation properties, combined with the self-leveling aspect, of the instant invention make it ideal for such an application.

Thus it can be seen that the potential fields of use for this invention are myriad, and the particular preferred embodiment described herein is in no way meant to be limiting the particular field chosen for exposition of the details of the invention.

2. Description of the Prior Art

Numerous food product carriers have been provided in prior art that are adapted to transport various types of perishable products from one location to another location, while protecting the food products therein. Also, leveling containers and supports of various sorts are old and well known. While these units may be suitable for the particular purpose to which they address, they would not be as suitable for the purposes of the present invention as heretofore described.

A search at the United States Patent and Trademark Office in the parent application of this application revealed the following U.S. Patents:

U.S. Pat. No. 3,338,629 issued to Philip A. Drees on Aug. 29, 1967, shows an automobile utility unit. The patented device shows a unit adapted to be removably coupled to the seat of an automobile and adjusted to an appropriate level. It includes a box-shaped body adapted to be used as a utility receptacle; a cover hinged to the front of the box and swingable forwardly to an obtuse angle with respect to the box to form a writing surface, preferably having a spring clip and rubber band holders for holding sheet materials; a tray slideably mounted in the bottom of the box and slidable forwardly to serve as a table for food and other objects; and an adjustable mounting means for mounting the unit on the seat. The patented device shows no powered leveler means, no food warming means, and no seat belt restraining means. To level the patented unit, the user must remove the unit from the seat and adjust the detents on the back side. The patented invention will not carry liquid containers under vehicle acceleration without spillage.

By contrast, the instant invention has an automatic pneumatic leveler means, built in food warming means, and seat belt restraining means. To level the instant invention the user need do nothing but plug the unit in to a remote electrical or pneumatic power source in a vehicle. If a the vehicle is on a hill the instant invention automatically adjusts to true gravitational level. If the vehicle is accelerating the instant invention automatically will tilt the food holder so as to maintain the apparent level. In other words liquids will not spill under acceleration with this invention.

U.S. Pat. No. 4,967,992 issued to David L. Menaged on Nov. 6, 1990, shows an inflatable reading stand. The patented invention shows an inflatable main body attached in air tight relation to an elongated base portion having a support edge. The main body includes an exposed surface structured to support a book or other reading material thereon. The elongated base has a hand pump and hose assembly attached thereto to permit inflation and deflation of the main body whereby the angle of the exposed surface can be adjusted relative to the horizontal plane, thereby allowing the user to view any reading material placed thereon while sitting in a comfortable upright sitting position. The patent does not contemplate the carrying of food or any other spillable item. In addition, the patented inflatable leveling assembly does not operate with power means, and does not automatically maintain a surface in a level position under dynamic conditions. The patented leveling device is designed to support a fixed device in a single fixed position. The patented device shows no seat belt retaining means or food warming means.

By contrast, the instant invention shows a food carrier for a non-level vehicle seat in a dynamic environment. The leveling means of this invention is automatic and requires no user intervention or continual adjustment to compensate for acceleration. In further contrast, the instant invention operates with power means, is equipped with seat belt retaining means, and can include food warming means.

U.S. Pat. No. 5,102,080 issued to Joseph Atieri, Jr. on Apr. 7, 1992, shows a pizza wedge support for a vehicle. A wedge member is arranged to provide a horizontal surface when disposed upon an inclined upper surface of an automotive seat. The wedge member is arranged to define an acute included angle from ten to thirty degrees. The organization, in an optional embodiment, includes a strap for receiving an automotive seat belt as well as an aligned series of cylindrical cup recesses for receiving cup members. Similar to the instant invention, the patented device does show a crude seat belt restraint means. However that is where the similarity ends. The patented device does not have an inflatable element and possesses no shock absorbing qualities. There is no means of adjusting the angle of repose of the device. There is no powered adjustment or food warming means.

By contrast, the instant invention has a pneumatic, shock absorbing support means. A pneumatic support is automatically adjustable to level under dynamic conditions without user intervention. By further contrast, the food is covered in the instant invention and the container includes warming means.

U.S. Pat. No. 3,499,595 issued to Durward L. Brooks on Mar. 10, 1970, shows a collapsible food and beverage service tray. The patented device is a collapsible one-use paperboard service tray for drive-in restaurants and the like having self-contained means for leveling and stabilizing the tray and its contents on the slanting surface of an automobile seat. The construction makes use of the seat back to support part of the load on the tray. Optionally, the tray may also be used on a level surface. The tray is not covered and contains no warming means. The leveling means is not adjustable, powered, or automatic. The device is designed for static use only and no seat belt restraint is disclosed. There is no shock absorbing means disclosed in the patented tray.

By contrast, the instant invention has a pneumatic, shock absorbing support means. A pneumatic support is automatically adjustable to level under dynamic conditions without user intervention. By further contrast, a cover, food warming means, and seat belt restraining means are taught by the instant invention.

U.S. Pat. No. 4,384,602 issued to Pauline A. Ores on May 24, 1983, shows an inflated carrying apparatus. A flexible material apparatus for carrying an article retained by an article receiving means, comprising a carrying member adapted for attachment to the article receiving means and having a hollow tube of flexible airtight material being partially pneumatically inflated to provide a pliant carrying member. One embodiment includes the article receiving means comprising a receptacle, such as a bag, having hermetically sealed and pneumatically inflatable bottom and end panels. The carrying member includes a flexible material handle attached to the end panels having fluid communication with the panels so that partial pneumatic inflation of the handle and panels is permitted, whereby carrying an article in the bag causes air to be displaced from one or more of the panels to cause the handle to become turgid. In another embodiment, a pair of handles is attached to the side panels, which are also hermetically sealed to provide fluid communication between each panel and handle. The handle may be U-shaped, and the bag and/or handle may be pneumatically inflated to 75% capacity. Other embodiments include the article receiving means comprising a cord for retaining an article, and the handle adapted for attachment thereto. In another embodiment, the receptacle comprises a backpack and the carrying member comprises an inflated shoulder strap. The patented device is not intended as a leveling support for articles in a dynamic environment. There is no disclosure of carrying the device in a vehicle with any sort of leveling device, or of warming food. There is no similarity with the instant invention except for the showing of an inflatable device with a handle.

By contrast, the instant invention has a pneumatic, shock absorbing support means. A pneumatic support is automatically adjustable to level under dynamic conditions without user intervention. By further contrast, a cover, food warming means, and seat belt restraining means are taught by the instant invention.

United Kingdom Patent Application No. GB 2,230,509A, published on Oct. 24, 1990, in the name of Jacqueline Hodgman, shows an inflatable mail bag. A mail bag with inflatable walls is formed of two rectangular sheets welded together at their side edges, folded and again welded together at their side edges. A first sheet is longer than a second sheet so as to provide a closure flap. Each wall may comprise separately inflatable sections. There is no similarity with the instant invention except for the showing of an inflatable device with a closure latch.

By contrast, the instant invention has a pneumatic, shock absorbing support means. A pneumatic support is automatically adjustable to level under dynamic conditions without user intervention. By further contrast, a cover, food warming means, and seat belt restraining means are taught by the instant invention.

SUMMARY OF THE INVENTION

A self-leveling food container device is provided which consists of a food carrying case sized to accommodate food therein. An integral mechanism is provided with the carrying case for automatic leveling when placed on a motor vehicle seat, so as to prevent the food within the carrying case from sliding and spilling while being transported. Insulated walls are provided to maintain food temperatures. Heating coils within the insulated walls allow warming of food during transport. An inflatable air bladder provides both the leveling mechanism and a vibration isolation function.

Accordingly, it is a principal object of the invention to provide a new and improved self-leveling food container which overcomes the disadvantages of the prior art in a simple but effective manner.

Another object is to provide a self-leveling food container which is suitable for carrying food in a moving motor vehicle.

Another object is to provide a self-leveling food container which will automatically level when it is placed upon a tilted surface such as a motor vehicle seat.

Another object is to provide a self-leveling food container which will automatically seek an artificial level during horizontal accelerations of the vehicle so as to eliminate liquid food spillage.

Another object is to provide a self-leveling food container which levels by means of an inflatable bladder which also provides effective vertical vibration isolation for the food during transport.

Another object is to provide a self-leveling food container which is insulated for preserving food temperatures.

Another object is to provide a self-leveling food container which is insulated and provided with heating elements for warming food during transport.

An additional object is to provide a self-leveling food container where the heating elements can be plugged into a cigarette lighter receptacle in a motor vehicle to receive electrical power from the battery of the vehicle.

An additional object is to provide a self-leveling food container where the electrical power from the battery of the vehicle is used generate compressed air to inflate the air bladder.

An additional object is to provide a self-leveling food container where a portable compressed air source is used generate compressed air to inflate the air bladder.

An additional object is to provide a self-leveling food container where the electrical power from the battery of the vehicle is used to power a small air compressor to generate compressed air to inflate the air bladder.

An additional object is to provide a self-leveling food container where a mercury switch level sensor is used to operate automatic level control devices.

Finally, it is a general goal of the invention to provide improved elements and arrangements thereof in an apparatus for the purposes described which is inexpensive, dependable and fully effective in accomplishing its intended purposes.

BRIEF DESCRIPTION OF THE DRAWINGS

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 3 is a perspective view with parts broken away, showing a level sensing switch, metering valve and bellow inflating mechanism therein.

FIG. 4 is a perspective view similar to FIG. 3, showing a second type of bellow inflating mechanism therein.

FIG. 5 is a perspective view similar to FIG. 3, showing a third type of bellow inflating mechanism therein.

FIG. 6 is a diagrammatic side view, showing schematically a level sensing switch and metering valve.

DETAILED DESCRIPTION OF THE PREFERRED EMBODIMENTS

Figure 1:
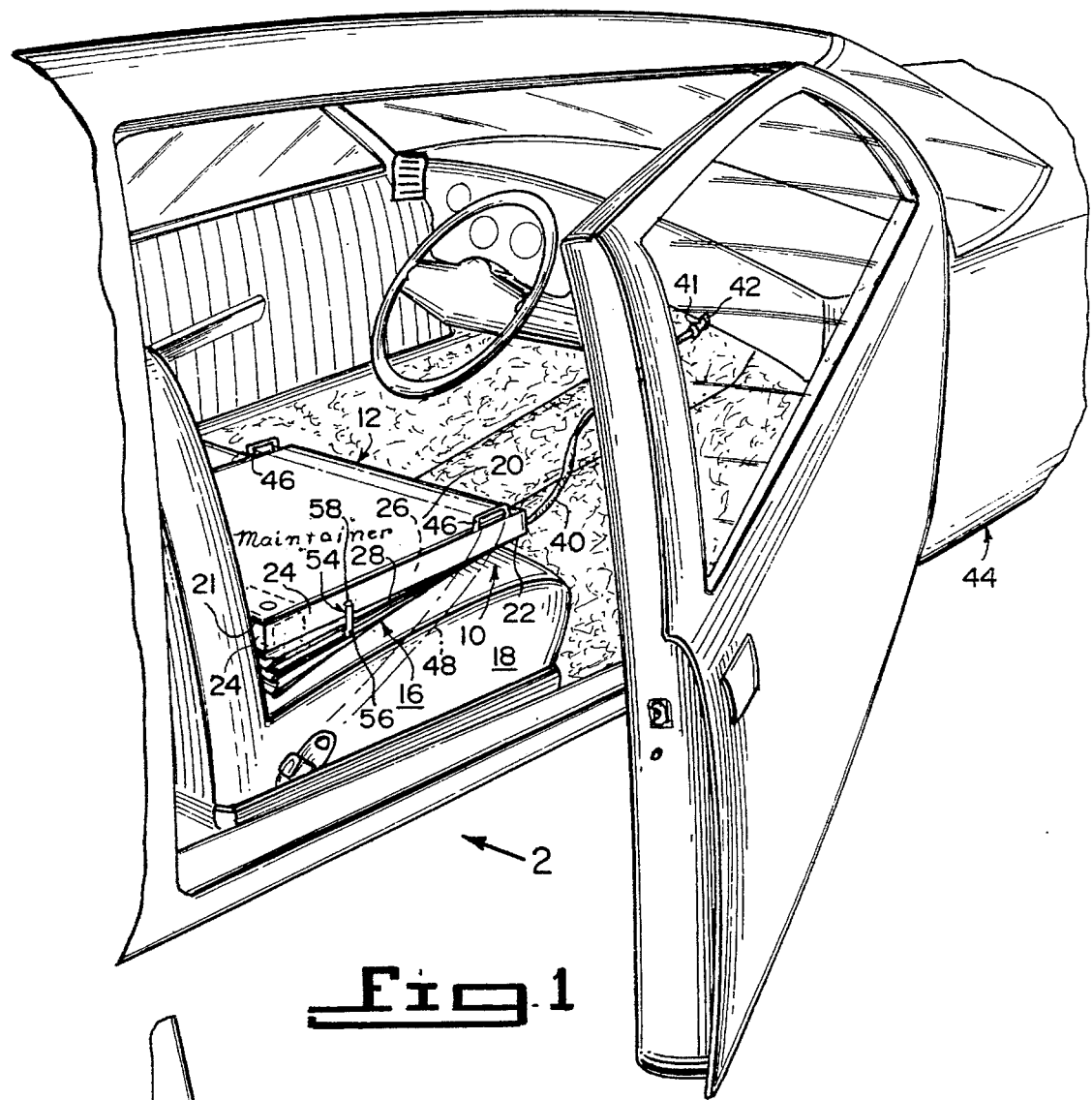
FIG. 1 is a perspective view of a portion of a motor vehicle with its door opened, showing the instant invention installed therein.

Turning now descriptively to the drawings, in which similar reference characters denote similar elements throughout the several views, the Figures illustrate a food container self-leveling device 10 which consists of a carrying case 12 sized to accommodate food 14 therein. A bladder mechanism 16 is integral with the carrying case 12, for automatically positioning the carrying case 12 from a tilted position to a horizontal position, when placed on a motor vehicle seat 18, so as to prevent the food 14 within the carrying case 12 from sliding and spilling, while being transported.

The carrying case 12 contains a top cover 20, a bottom wall 22, and a plurality of upstanding walls 24, bounding an internal compartment 26 for the food 14. The walls, cover, and bottom may be strung with high resistance heating wires 13 so as to provide warming to internal compartment 26 upon the application of suitable electrical energy. A hinge 21 is between a rear edge of the top cover 20 and the rear upstanding wall 24, and a hinged front flap 23 is on a front edge of the top cover 20. The hinges are preferably "live" hinges formed by reduced sections of the exterior plastic or fiberboard material of the walls, cover, bottom, and front flap. Mating hook and loop pile fastener material 25 between the front flap 23 and the front upstanding wall 24 serves to secure the top cover 20 over the internal compartment.

Automatic positioning mechanism 16 includes accordion bellows 28 mounted to the bottom wall 22 of the carrying case 12, so that when bellows 28 is inflated it will cause the rear portion of the bottom wall 22 to rise from a tilted position to a horizontal position. Automatic positioning mechanism 16 also includes an assembly 30 for inflating the bellows 28. An apparatus 32 is for activating the bellows inflating assembly 30, so that the carrying case 12 can go from the tilted position to the horizontal position. It is important to note that inflating assembly 30 is also capable of deflating bellows 28 or releasing pressurized air therefrom as more fully described later. Note that case 12 is effectively suspended on an air spring once it has been inflated. This air spring suspension is effective in isolating ride vibrations and road shocks from the carried foodstuffs. The vibration isolation effectiveness of air springs are well known in the prior art and the best known example is the pneumatic tires of road vehicles.

Figure 2:
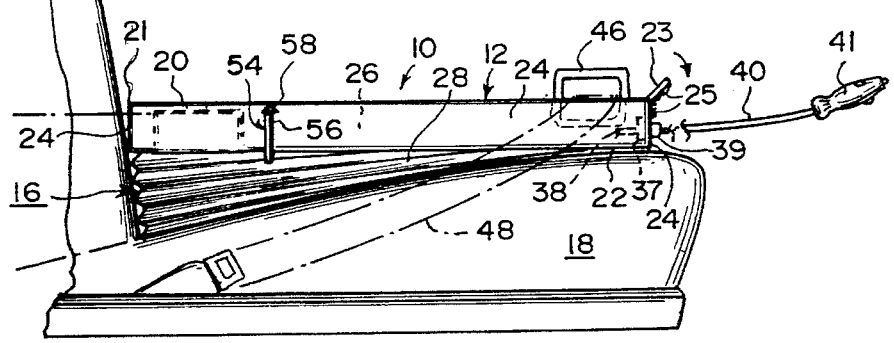
FIG. 2 is a side view of the instant invention on the seat taken in direction of arrow 2 in FIG. 1.

The activating apparatus 32 contains a battery-operated normally open level sensing switch 34 and a metering valve 36, electrically connected to the level sensing switch 34 and mechanically coupled to the bellows inflating assembly 30. Although valve 36 is only shown schematically, it is understood it could be designed as any conventional 3-way electrically controlled fluid flow valve. Switch 34 may be a conventional mercury switch. When the carrying case 12 is tilted the level sensing switch 34 closes, causing the metering valve 36 to pass pressurized air into the bellows cavity. This will cause a clockwise rotation of case 12 as seen in FIGS. 1–3. When switch 43 senses a tilt too far in the other direction it will cause valve 36 to port the pressurized air in the bellows to the atmosphere. This will cause a counterclockwise rotation of case 12 as seen in FIGS. 1–3. Between the two extreme positions of tilting which will activate valve 36 is a "dead zone" of the mercury switch which will be effective to hold valve 36 in a neutral position and neither add or remove air from the bladder. This self-leveling operation is well known in the art and is used in self-leveling air spring suspensions of many current cars and trucks. Further detailed description is not believed to be necessary here. However, one special feature of the operation of the self-leveling apparatus thus far described deserves mention.

The artisan will note that upon horizontal forward linear acceleration of the automotive vehicle in which the invention is mounted, the mercury in sensor switch 34 will slosh rearwardly and create a signal as though case 12 had been tilted too far downward to the rear (counterclockwise) This will cause the bellows to inflate slightly and thus cause case 12 to "lean in" to the acceleration. Another way of stating this is to say the case always seeks an "artificial" level position in the presence of horizontal accelerations. This artificial level is such that a container of liquid will always maintain itself such that the liquid surface remains parallel with the upper edges of the container. In other words, a cup of coffee will not spill! Braking or decelerations will operate in exactly the same manner but in the opposite direction.

The activating apparatus 32 further includes an electrical socket 37 mounted in the front upstanding wall 24 of the carrying case 20. A first electrical cord 38 is connected between the level sensing switch 34 and the socket 37. A first plug 39 fits into the socket 27, while a second electrical cord 40 is connected at one end to the first plug 39. A second plug 41 is on an opposite end of the second electrical cord 40, which may be readily plugged into a cigarette lighter receptacle 42 in a motor vehicle 44, so as to receive electrical power from a battery (not shown) within the motor vehicle 44.

The food container self-leveling device 10 further contains a pair of spaced apart floppy ears 46 mounted to the top cover 20 of the carrying case 12, so as to secure the carrying case 12 on the motor vehicle seat 18 using a seat belt 48. Placing the seat belt securement ears 46 means on top cover 20 has a special and unique purpose. If the food delivery man uses the seat belt securement means as required, he will first be forced to close the cover over the food. Therefore, the customer will be assured of getting the freshest and hottest possible food.

The bellows inflating assembly 30 consists of a pressure accumulator 50, mechanically coupled between metering valve 36 and bellows 28. A general structure 52 is provided for supplying compressed gas into the pressure accumulator 50.

The compressed gas supplying structure 52 can be a motor and compressor 60, as shown in FIG. 3, a pressurized gas cartridge 62 and cartridge receptacle 63, as shown in FIG. 4, or simply a conduit 64 fluidly connected to a pressurized bladder 66 and unshown remote compressed air source, as shown in FIG. 5. It is important to note that some sort of accumulator structure, such as bladder 66 of FIG. 5 or the pressure accumulator labeled in FIG. 3, is desirable to have a large volume of air ready for rapid porting to the bladder to keep up with the dynamically changing accelerations in a moving vehicle.

The food container self-leveling device 10 further includes a bleed valve or bellows deflating assembly 54 (FIGS. 1&2) for deflating the bellows 28, so that the device 10 can be stored when not in use. The bellows deflating assembly 54 contains an exhaust tube 56 extending upwardly from one side of the bellows 28. A release cap or valve 58 is on the exhaust tube 56, which when activated will allow the pressurized gas within the bellows 28 to exit through the exhaust tube. The valve 58 is similar to a conventional tire stem pressure release valve.

The carrying case 12 can be fabricated in various different sizes, so that it an be utilized for holding pizza, soup, chicken and other types of foods 14. The artisan will recognize many types of compartments cup holders, etc. that may be built into case 12 for carrying and assortment of perishable items.

A battery operated electric heating source, such as imbedded resistance wires 13, can be operatively arranged as an integral part of the carrying case 12 in the walls thereof, to effectively warm food 14. The electrical cord 38 with the plug 40 can also be electrically connected to the heating source in a conventional manner. It is contemplated that conventional heated and insulated panels could be easily used to construct case 12.

LIST OF REFERENCE NUMBERS 10 food container self-leveling device
12 insulated carrying case
13 imbedded heater wires
14 food
16 automatic positioning mechanism
18 motor vehicle seat
20 top cover of 12
21 hinge between 20 and 24
22 bottom wall of 12
23 front flap on 20
24 upstanding wall of 12
25 mating hook and loop pile fastener material
26 internal compartment in 12
28 bellows
30 bellows inflating assembly
32 activating apparatus
34 level sensing switch
36 metering valve
37 socket in 24
38 first electrical cord between 34 and 37
39 first plug
40 second electrical cord on 39
41 second plug on 39
42 cigarette lighter receptacle
44 motor vehicle
46 floppy ear on 20
48 seat belt
50 pressure accumulator
52 compressed gas supplying structure
54 bellows deflating assembly
56 exhaust tube
58 release cap
60 motor and compressor for 52
62 pressurized gas cartridge for 52
63 cartridge receptacle
64 conduit for 52
66 pressurized bladder for 50

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. The combination of a self-leveling perishable product container and a vehicle with a seat and a seat belt restraint device which comprises:

an insulated carrying case having a hinged top cover, a bottom wall and a front, rear, and side upstanding walls for totally enclosing a perishable product therein;

automatic dynamic leveling means integral with said carrying case, for maintaining said carrying case from in an artificial level position in spite of the presence of horizontal driving accelerations generated by said vehicle when said case is placed on said vehicle seat;

retaining means attached to said hinged top cover for attaching said seat belt around said carrying case so as to positively prevent the horizontal driving accelerations from displacing said case from said seat; and vibration isolation means incorporated in said leveling means for diminishing vertical ride vibrations generated by said vehicle; wherein the perishable item within said carrying case is both prevented from sliding and spilling, and protected from ride vibrations while being transported in said vehicle.

2. The combination of claim 1, wherein said self-leveling perishable product container further comprises;

a hinge between a rear edge of said top cover and said rear upstanding wall;

a front flap on a front edge of said top cover; and mating hook and loop pile fastener material between said front flap and said front upstanding wall to secure said top cover thereto.

3. The combination of claim 1, wherein said leveling means further comprises;

a bellows mounted to said bottom wall of said carrying case, so that when said bellows is inflated it will cause an edge of said bottom wall to rotate.

4. The combination of claim 3, wherein said leveling means further comprises;

inflation means for inflating said bellows.

5. The combination of claim 3, wherein said leveling means further comprises;

activation means for selectively activating said inflation means, so as to maintain said carrying case in a horizontal position in a static environment and so as to maintain said carrying case in an artificial level position in a dynamic environment.

6. The combination of claim 5, wherein said activation means further comprises a level sensing switch; and a metering valve electrically connected to said level sensing switch and mechanically coupled to said inflation means; so that when said carrying case is in a tilted position said level sensing switch will cause said metering valve to activate said bellows inflating means until said carrying case is in a horizontal position.

7. The combination of claim 6, wherein said activation means further comprises;

an electrical socket mounted in said front upstanding wall of said carrying case;

a first electrical cord connected between said level sensing switch and said socket;

a first plug to fit into said socket;

a second electrical cord connected at one end to said first plug; and a second electrical plug on an opposite end of said second electrical cord, which is adapted to plug into a cigarette lighter receptacle in a said vehicle, so as to receive electrical power from said motor vehicle.

8. The combination of claim 1, wherein said retaining means further comprises;

a pair of spaced apart floppy ears mounted to said top wall of said carrying case, so as to secure said carrying case on said seat of said vehicle seat using said seat belt after said top wall has been closed to enclose the perishable product.

9. The combination of claim 5, wherein said inflation means further comprises;

a pressure accumulator mechanically coupled between said metering valve and said bellows; and gas supply means for supplying compressed gas into said pressure accumulator.

10. The combination of claim 9, wherein said self-leveling perishable product container further comprises;

manual deflation means for deflating said bellows, so that said container can be stored when not in use.

11. The combination of claim 9, wherein said manual deflation means comprises;

an exhaust tube extending upwardly from one side of said bellows; and a release valve in said exhaust tube, which when activated will allow pressurized gas within said bellows to exit through said exhaust tube.

12. The combination of claim 9, wherein said gas supply means is a motor and compressor.

13. The combination of claim 9, wherein said gas supply means is a pressurized gas cartridge and cartridge receptacle.

14. The combination of claim 9, wherein said gas supply means is a conduit fluidly connected to an external compressed air source.

15. The combination of claim 9, wherein said pressure accumulator is a pressurized bladder.

16. The combination of claim 1, wherein said self-leveling perishable product container further comprises;

heating means within said container for providing heat to the perishable product enclosed therein; and external electric power means for providing energy to said heating means.

17. The combination of claim 16, wherein said heating means comprises resistive heating wires imbedded in said hinged top cover, bottom wall and a front, rear, and side upstanding walls, and said external electrical power means comprises a cord and plug for inserting into a cigarette lighter socket in said vehicle.

* * * * *